United States Patent [19]

Foster et al.

[11] 4,337,116
[45] Jun. 29, 1982

[54] CONTOURED MOLDED PULP CONTAINER WITH POLYESTER LINER

[75] Inventors: Peter D. Foster, Waterville; Clifford Stowers, Fairfield, both of Me.

[73] Assignee: Keyes Fibre Company, Waterville, Me.

[21] Appl. No.: 228,876

[22] Filed: Jan. 26, 1981

Related U.S. Application Data

[63] Continuation of Ser. No. 70,392, Aug. 28, 1979, abandoned.

[51] Int. Cl.³ ............................................. D21J 3/00
[52] U.S. Cl. ................................. 162/158; 162/224; 162/222; 162/231; 156/212; 156/285; 156/309.9; 156/322; 229/2.5 R; 426/113; 426/114; 428/35; 428/174; 428/481; 219/10.55 E
[58] Field of Search ............... 162/221, 222, 231, 158, 162/224; 156/244.27, 244.21, 212, 213, 322, 309.9, 285; 428/174, 481, 35; 426/113, 114; 229/2.5 R; 219/10.55 E

[56] References Cited

U.S. PATENT DOCUMENTS

| | | | |
|---|---|---|---|
| 2,986,490 | 5/1961 | Randall et al. | 162/222 |
| 3,453,162 | 7/1969 | Turner | 156/244.21 |
| 3,657,044 | 4/1972 | Singer | 156/212 |
| 3,697,369 | 10/1972 | Amberg et al. | 428/513 |
| 3,932,105 | 1/1976 | Knoell | 425/504 |
| 3,939,025 | 2/1976 | Kane | 428/481 |
| 3,953,283 | 4/1976 | Wing et al. | 162/158 |
| 4,145,239 | 3/1979 | Fujii | 156/212 |
| 4,147,836 | 4/1979 | Middleton et al. | 428/481 |
| 4,200,481 | 4/1980 | Faller | 425/504 |
| 4,202,465 | 5/1980 | McLaren | 426/114 |

FOREIGN PATENT DOCUMENTS

2,125,978 12/1971 Fed. Rep. of Germany.

Primary Examiner—William F. Smith
Attorney, Agent, or Firm—Connolly and Hutz

[57] ABSTRACT

An inexpensive, disposable, three-dimensionally contoured container, suitable for many purposes including holding food during exposure to high temperatures for long times in either a microwave or a conventional oven without any detrimental effect to the container or the food. The container consists of an essentially impervious liner of polyethylene terephthalate directly bonded by its own substance to a pre-formed contoured base obtained by molding to final shape nonbrowning substantially 100% bleached kraft wood pulp from an aqueous slurry thereof against an open-face suction mold, and drying the same under pressure imposed by a mating pair of heated dies. The liner is formed by bonding to the pulp base a 0.5-2.0 mil thick film of thermoformable, substantially amorphous, substantially unoriented polyethylene terephthalate having a molecular weight which is understood to be in excess of 15,000. The film is bonded to the base by pre-heating the base, rapidly pre-heating the film and then quickly pressing the film into contact with the base at a temperature in the range of 300°–375° F., the pressing being done by vacuum in the range of about 20 inches of mercury applied through the base for no longer than about 1 second, and finally cooling so that the liner thereafter will not shrink-separate away from the contoured base as a result of subsequently exposing the container to a temperature of up to 400° F.

17 Claims, 5 Drawing Figures

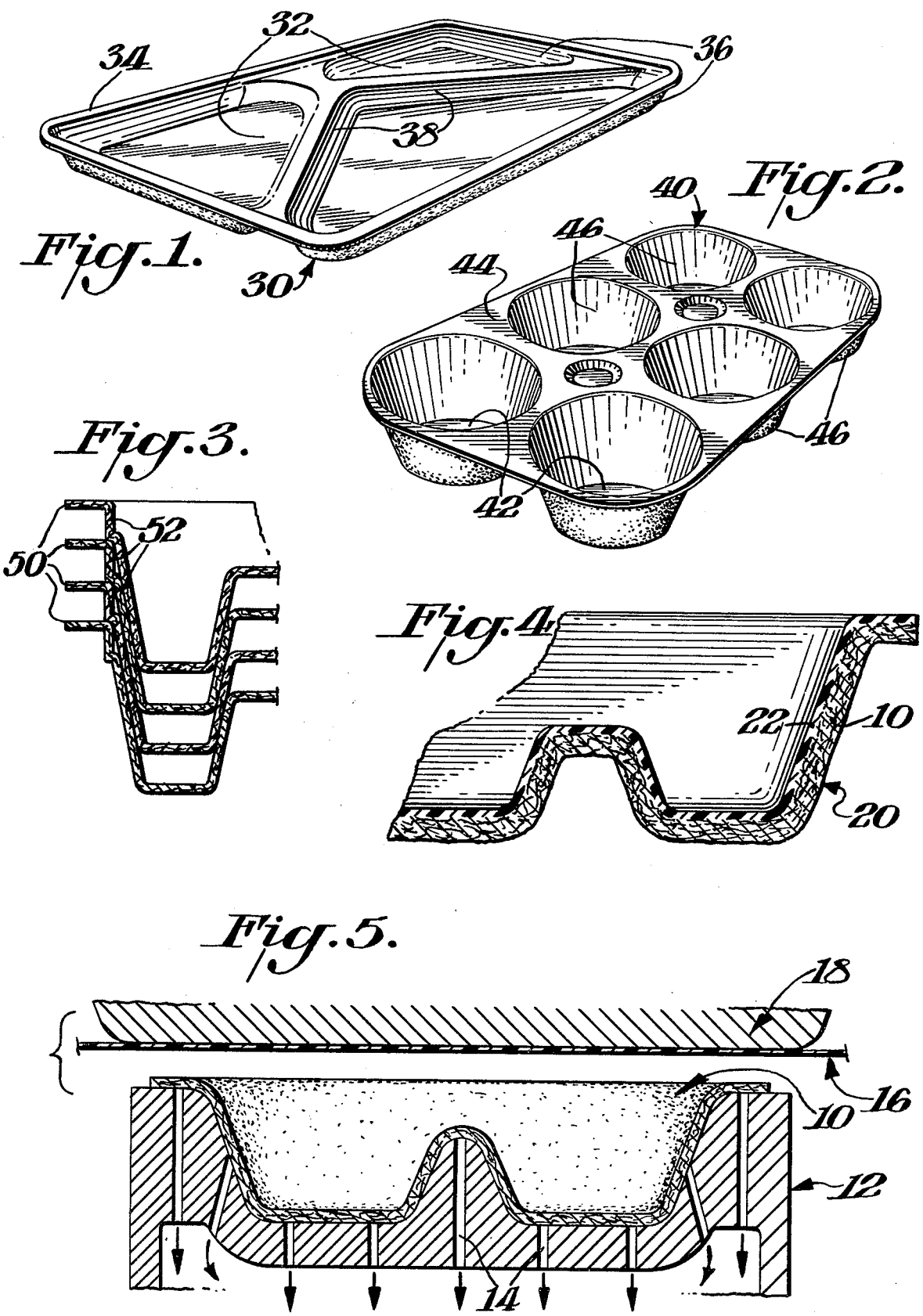

CONTOURED MOLDED PULP CONTAINER WITH POLYESTER LINER

CROSS REFERENCE TO RELATED APPLICATION

This application is a continuation of application Ser. No. 070,392 filed Aug. 28, 1979 abandoned.

BACKGROUND OF THE INVENTION

This invention relates to the field of contoured molded pulp products, such as containers for food or the like, which have a plastic liner on at least one surface, usually the upper food containing surface, and provides for the first time, it is believed, such a product which can be subjected without damage to temperatures of up to 400° F. when empty for a short time, and for as long as 45 minutes when the contained food or other substance is at room temperature of below at the outset.

Prior to the present invention, it has long been known that various thermoplastic materials, including polyesters, can be bonded by heat and pressure to a pre-formed and contoured body molded of fibrous pulp material. This provides an attractive and highly moisture resistant container, suitable for purposes such as plates, bowls and the like for serving food. These products as previously known are not suitable, however, for use as ovenable containers involving exposure to high temperature for long times because, among other deficiencies, the plastic liner either melts or shrink-separates away from the molded pulp base when exposed to high temperatures, and the pulp exhibits significant undesirable browning or even outright charring when exposed to such temperatures for long times. Representative examples of prior art patents disclosing such containers are as follows.

Stevens U.S. Pat. No. 2,590,221 (Mar. 1952) discloses a method of fusing or bonding a sheet of thermoplastic material, such as polyethylene, to a contoured molded pulp body by heating the face of the thermoplastic material to be bonded with the pulp to the fusion point while allegedly maintaining the opposite face at a temperature below the fusion point.

Amberg U.S. Pat. No. 3,616,197 (Oct. 1971) discloses a method of adhering a liner of polypropylene film to a contoured molded pulp plate by means of an intermediate adhesive layer, such as a pigmented polyamide ink or a pigmented resin emulsion.

Singer U.S. Pat. No. 3,657,044 (Apr. 1972) discloses a method of bonding a sheet of thermoplastic material, including polyester, to a contoured molded pulp body by the use of superatmospheric pressure to force the thermoplastic against the molded pulp.

Amberg U.S. Pat. No. 3,697,369 (Oct. 1972) discloses a method of fusing or bonding a liner of polypropelene film to a contoured molded pulp plate by means of an intermediate layer of polyethylene which secures the bond with the molded pulp.

South African Pat. No. 73/2988 (May 1972) discloses a method of bonding a previously coextruded laminate of polypropylene and polyethylene to a contoured molded pulp body.

More recently it has been discovered that ovenable containers suitable for use in the re-heating and/or further cooking of food in microwave and conventional ovens can be made by either press-forming them, or folding and adhering them, from a sheet of flat paperboard having a coating of substantially amorphous polyethylene terephthalate bonded by its own substance to at least one surface thereof. These food containers present several problems, however, such as the fact that the press-forming or the folding and adhering of the container from the flat sheet is expensive, and there is a danger that the coating will rupture at the bend or fold lines. Such containers usually are neither as strong nor as attractive as molded containers. Also, the press-formed or folded-up container necessarily has pleats or folds and/or corner gaps which are completely unacceptable in certain containers, such as muffin baking trays, and they preclude hermetic sealing of a plastic overwrap. Representative examples of prior art patents disclosing such containers are as follows.

Kane U.S. Pat. No. 3,924,013 (Dec. 1975) discloses the formation of an ovenable food container from a laminate which includes nonbrowning paperboard with a coating of substantially amorphous polyethylene terephthalate extruded as a hot resin directly thereon and bonded thereto by its own substance.

Middleton U.S. Pat. No. 4,147,836 (Apr. 1979) discloses the formation of an ovenable food container from a laminate which includes paperboard coated, by a process which includes subjecting the paperboard to a corona discharge, with polyethylene terephthalate, noting that the crystallinity of the latter does not substantially affect the adhesion of the coating to the paperboard.

Thus, the problem heretofore unresolved by the prior art is the ability to provide an inexpensive, disposable container which is three-dimensionally contoured without pleats or folds, and which is capable, among other things, of holding food during exposure to high temperatures for long times in either microwave or conventional ovens without having the plastic liner melt or shrink-separate away from the contoured base, without any significant undesirable browning of the base, and without any other detrimental effect to the container or the food.

SUMMARY OF THE INVENTION

The product of this invention comprises a pre-formed contoured base molded of fibrous pulp with a liner directly bonded to at least one contoured portion of at least one side of the base, the liner consisting essentially of polyethylene terephthalate which will not shrink-separate away from the contoured base as a result of exposure to a temperature of about 400° F. The process of this invention comprises the steps of pre-heating a pre-formed contoured base molded of fibrous pulp, rapidly pre-heating a thin film of substantially amorphous, substantially unoriented polyethylene terephthalate to a temperature above the temperature at which it starts to crystallize and then quickly pressing the pre-heated film into contact with at least one contoured portion of at least one surface of the pre-heated base at a temperature and for a time which insures that the film is stretched into direct contact with the contoured base and becomes directly bonded thereto to form a contiguous and integral liner thereon, and finally allowing the base and liner to cool to room temperature.

BRIEF DESCRIPTION OF THE DRAWINGS

Numerous advantages of the present invention will be readily apparent to one skilled in the art from a reading of the detailed description in conjunction with the accompanying drawings wherein similar reference characters refer to similar parts, and in which:

FIG. 1 is a pictorial view of a relatively simply and shallowly contoured food serving container of a type with which this invention is useful;

FIG. 2 is a pictorial view of a relatively intricately and deeply contoured muffin baking container of a type with which this invention is useful;

FIG. 3 is a fragmentary sectional elevational view showing a plurality of representative empty containers nested one within another in a stack for shipment and storage;

FIG. 4 is an enlarged fragmentary sectional elevational view, with the scale greatly exaggerated for purposes of clarity, showing a contoured molded pulp base with a polyester liner bonded by its own substrate to the upper surface thereof; and, FIG. 5 is a highly schematic sectional elevational view, again with the scale exaggerated, showing the essential elements of the apparatus for practicing the process of bonding together the pre-formed base and film according to this invention.

DETAILED DESCRIPTION OF THE INVENTION

The present invention will be described in detail by explaining first the pre-formed molded pulp base, second the polyethylene terephthalate film, third the process for bonding the film to the base, and fourth the polyester lined molded pulp product attained thereby.

First, the pre-formed molded pulp base determines the shape and size of the product of this invention, which is dimensioned as dictated by the end use for which the product is intended. The base may be obtained according to any one of several well-known pulp molding techniques.

For high quality products, such as ovenable containers for merchandizing food products according to the presently preferred embodiment of this invention, the molded pulp base is obtained by the "precision molding" process, which is also variously known as a "die-drying" or "close-drying" process. Precision molded pulp articles are obtained by molding fibrous pulp from an aqueous slurry thereof against a screen-covered open-face suction mold to substantially finished contoured shape, and then drying the damp pre-form under strong pressure imposed by a mating pair of heated dies. This may be done, for instance, by apparatus and according to methods such as those described in Randall U.S. Pat. No. 2,183,869 (Dec. 1939). Precision molded pulp articles are dense, hard and boardy, with an extremely smooth, hot-ironed surface finish. Such precision molded pulp articles have been made and sold in the form of disposable plates, bowls and the like for many years under the trademark "CHINET" by Keyes Fibre Company of Waterville, Maine, U.S.

In addition to a pulp base obtained by the precision molding process, molded pulp articles produced according to the well-known "free-dried" or "open-dired" process similarly may be used in the practice of this invention. The free-dried process involves molding fibrous pulp from an aqueous slurry thereof against a screen-covered open-face suction mold to substantially finished contoured shape, and then drying the damp pre-form in a free space such as placing it on a conveyor and moving it slowly through a heated drying oven. Such molded pulp articles are characterized by a noncompacted consistency, resilient softness, and an irregular fibrous feel and appearance. When using free-dried molded pulp bases in the practice of this invention, the rougher fibrous surface thereof requires that the film be pressed against the surface of the pulp base in the bonding process at somewhat lower temperatures and/or pressures, as can be understood, to insure that the film retains sufficient strength that it will not be subjected to pinhole punctures by the unpressed surface fibers of the pulp base.

Molded pulp bases obtained by other well-known pulp molding processes similarly are useful in the practice of this invention. This includes molded pulp articles which are first molded according to the free-dried process, and then "after-pressed" in the manner disclosd in Randall U.S. Pat. No. 2,704,493 (Mar. 1955). This also includes molded pulp articles which are first molded according to the free-dried process, and then placed on open-face warpage preventing forms on the conveyor which moves the articles through the drying oven, which simply hold the articles to prevent shape distortion from warpage during the drying process, as disclosed in Reifers U.S. Pat. No. 3,185,370 (May 1965).

According to the preferred embodiment of this invention, the pulp consists of substantially 100% bleached kraft wood fibers. This material is preferred because it is nonbrowning in the sense that, when exposed to a temperature of about 400° F. for as long as 15 minutes, it will not noticably discolor from its attractive white, beyond perhaps a slight yellowing, to a significant undesirable brown, and certainly will not scorch or char. When food or other substances at room temperature or below are in close proximity to provide a heat sink effect, this material can be exposed to temperatures of up to 450° F. for as long as 45 minutes without exhibiting any significant bronwing.

Other types and grades of fibrous pulp can be used, however, without defeating the broader objects of this invention, when the end use of the product does not contemplate exposure to such temperatures for such times.

Irrespective of the molding process or the type or grade of pulp used to obtain the base, the same may be treated with fluorocarbon oil repellant sizing and/or reactive synthetic water sizing or other well known sizing, which quite surprisingly does not interfere with the bonding step explained below.

Whether the molded pulp bases are obtained according to the precision molding process, or one of the several variations of the free-drying process, they are in any event molded to substantially finished three-dimensional shape, which may be contoured simply or intricately, shallowly or deeply, according to the ultimate use to which the polyester lined product will be put. In every case, the contours include horizontal wall portions and sloping wall portions, but no substantially vertical wall portions.

The absence of substantial vertical wall portions, other than minor vertical shoulders or lugs of the type which are well known for anti-jamming or de-nesting purposes, permits a plurality of like empty bases, and of course the finished lined products which are made from them as well, to be nested one within another in a stack of the same for compact, inexpensive and convenient shipment and storage purposes. By the same token, the molded pulp bases, and the finished lined products made from them as well, are of substantially uniform single thickness throughout, in the sense that every contour of consequence which projects outwardly from one side of the product is reflected by a corresponding recess in the other side of the product.

Second, the polyethylene terephthalate film from which the liner of the moled pulp base is obtained is a thin film of thermoformable, substantially amorphous, substantially unoriented polyethylene terephthalate, which is understood to have a relatively high molecular weight. While such polyethylene terephthalate is available in sheet form with a thickness exceeding about 7.0 mil, it is preferred to practice this invention with such material in thinner film form, having a thickness of less than about 7.0 mil. Such material is commercially available under the brand name "PETRA" from Allied Chemical Corporation of Morristown, N.J. U.S., and many of its below discussed properties are explained, it is believed, in German Offenlgungsschrift No. 2125978 (Dec. 1971).

According to the preferred embodiment of this invention, where a film of such polyethylene terephthalate is bonded to a base having a smooth surface obtained by the precision molding process, a film with a thickness of between about 0.5 mil and about 2.0 mil is preferred, and films with a thickness of approximately 1.0 mil, namely 0.9 mil and 1.25 mil, have proved very satisfactory. When practicing this invention to produce extremely intricately and deeply contoured containers, such as muffin baking trays with a plurality of deep, closely-spaced pockets or recesses, or with molded pulp bases obtained by the free-drying process with relatively rough surfaces, however, then somewhat thicker films may be advisable to accommodate severe stretching or to safeguard against undesirable pinholeing, as can be understood.

The polyethylene terephthalate film useful according to this invention is thermoformable in the sense that it becomes thermoformable to the extent that it can be stretched and formed into conformity with the shallower contoured molded pulp bases at and above a temperature of about 170° F. This material melts to a liquid at temperatures in excess of about 480° F. to about 490° F.

This film is substantially amorphous, being practically transparent and having less than about 5% crystallinity. Above the lowest thermoforming temperature and below the melting temperature, however, this material will spontaneously crystallize. A film with a thickness of about 1 mil, for example, will crystallize substantially when held for 2 to 15 seconds in the temperature range between about 250° F. and about 400° F. When held for such times within the crystallizing temperature range, the film turns from substantially transparent to translucent white, evidencing increased crystallinity, and becomes brittle and not readily bondable with molded pulp at any temperature below about 400° F. It is noteworthy, however, that exposure of the film to the crystallizing temperature range for less than a few seconds will not result in a detrimental increase in crystallinity which has a material adverse affect on either the formable or the bondable characteristics of the film. This is an attribute which, it is now believed, may be responsible for many of the improved results attained by this invention, as explained in greater detail below.

The polyethylene terephthalate film useful according to this invention is substantially unoriented, which means that the film is not deliberately stretched during manufacture. The film is understood to be formed by extruding polyethylene terephthalate resin through a slit die at a temperature of between about 510° F. and about 540° F., and cooling the flat thin extrudate on a polished roll at a temperature of between about 60° F. and about 200° F. Some small degree of longitudinal orientation undoubtedly occurs during extrusion of the resin into the film, but it is understood that the degree thereof is minimized by extruding through the slit die and cooling on a polished roll.

Use of polyethylene terephthalate having a relatively high molecular weight is now believed to be an important, although perhaps not critical, feature of the present invention. In actual practice, material with a molecular weight which is understood to be in excess of about 15,000, namely in the range of 15,000 to 30,000, has been found to be useful, and is now preferred. This is in contrast with polyethylene terephthalate having a relatively low molecular weight, such as a molecular weight not exceeding about 10,000. It is contemplated, however, that molecular weights as low as about 12,000 may still prove useful for the production of lined containers or other products in which the contours are quite shallow requiring minimal stretching of the film prior to bonding, and the contemplated end use of the product is such that a minimal mechanical bond between the liner and the base can be tolerated.

Third, the process for bonding the film to the base comprises the steps of pre-heating the pre-formed base obtained in the manner explained above, rapidly pre-heating a film of polyethylene terephthalate having the characteristics described above and then quickly hot pressing the pre-heated film into contact with the surface of the pre-heated base which is to have a liner formed thereon, the hot pressing being done at a temperature and for a time which insures that the film is stretched into direct contact with the contoured base, and becomes directly bonded by its own substance to the base so as to form a contiguous and integral liner thereon, and finally cooling the base and liner to room temperature.

More precisely, and with reference to FIG. 5, the presently preferred process is accomplished as follows. The pre-formed precision molded pulp base 10 is placed in an openface die or mold 12, which is dimensioned to provide full support for the base by supporting the lower surface thereof which is not to be coated with the polyester liner.

The die 12 is made with suction ports 14 connected with a source of vacuum (not shown) so that vacuum can be applied through the base during the bonding steps of the process. Preferably, the vacuum applied is in the range of about 20 inches of mercury, although lower values will be suitable for the shallower contoured articles and/or thinner films and higher values may be advisable for the deeper contoured articles and/or thicker films.

The die 12 is maintained by conventional heating means (not shown) at an elevated temperature in the range between about 300° F. and about 600° F. The appropriate temperature is selected within this range to insure that the molded pulp base, after being placed therein, will be pre-heated, in the time available prior to the bonding step, to a temperature such that the surface to receive the film is in the range between about 300° F. and about 375° F., which means that the opposite surface in contact with the heated die may attain higher temperatures for a short time. When the molded pulp base is relatively thick, and/or when it has a relatively intricately and/or deeply contoured shape, then pre-heating to higher temperatures will be required, as can be understood, whereas thinner bases, with relatively simply and shallowly contoured shapes, or where minimal bonding can be tolerated, will permit pre-heating temperatures in the lower end of the range. In any event, the base is pre-heated to insure that the surface to which the film will be bonded is at the desired temperature, and preferably although certainly not necessarily by the simple expedient of holding the base for a short time in a heated die.

The film of polyethylene terephthalate 16 also is preheated, and placed in position closely opposing the exposed surfaces of the molded pulp base 10 against which it is to be applied. The manner in which the film is positioned is not an essential feature of the present invention, since it can be accomplished in a number of ways. Because the film should be pre-heated rapidly and then quickly pressed against the base, it is recommended that the film be positioned with respect to the base before or at least as part of the pre-heating step.

The film can be pre-heated in any suitable manner which will insure that it is raised from room temperature past and substantially above both the temperature at which it becomes thermoformable and the temperature at which it starts to crystallize in a relatively short time. According to the preferred process, the film 16 is placed in contact with a plate 18, which may be coated with a material such as Teflon simply to insure that the film 16 does not stick to the plate 18. The plate 18 is maintained by suitable heating means (not shown) at an elevated temperature in the range between about 325° F. and about 400° F., the temperature within this range being selected as required by the thickness of the film and its molecular weight. Thicker film with a thickness up to about 7.0 mil will require that the plate 18 be maintained at a higher temperature within the range, or that the film be held in contact with the plate for a slightly longer period of time, as can be understood, whereas thinner film with a thickness close to approximately 1 mil can be pre-heated rapidly to the requisite bonding temperature by contact with a plate maintained at a lower temperature within the range.

The film should be pre-heated rapidly, at least during that portion of the pre-heating which is in the temperature range in which the polyethylene terephthalate crystallizes. For instance, with film having a thickness of between about 0.5 mil and about 2.0 mil, the film is pre-heated from room temperature to the bonding temperature in a period of time which does not exceed about 2 seconds.

The base having been appropriately pre-heated, as soon as the film has been pre-heated to the desired elevated temperature, vacuum quickly is applied through the base 10 to suction-press the film into contact with the surface or surfaces of the base which are desired to be coated. The film at its pre-heated elevated temperature is stretched into direct contact with the contoured base, and the film becomes thinned in areas and to extents as determined by the shapes and depths of the contours of the base. Continued application of pressure induced by the vacuum insures that the film becomes directly bonded, by its own substance, to the exposed surface or surfaces of the molded pulp base so as to form a contiguous and integral liner on the base.

If desired, the film can be suction-applied against both sides of the base, such as the undersurface of the marginal rim or flange of the molded pulp base in the manner explained in the aforesaid Singer patent, although this is wholly optional. Similarly, the step of pressing the film into contact with the base may include super-atmospheric or mechanical pressing instead of or in addition to vacuum pressure, such as by a movable die to press the film against the marginal rim or flange, or other portions, of the base, although this also is deemed to be a purely optional feature as the present invention is now understood. By the same token, the film may be pressed against only a portion of only one surface of the base, such as in situations where the base includes a contoured bottom container portion with a hingedly connected closeable cover portion, and only the inside of the bottom container portion is to be lined with plastic. Also, either the base or the film or both may contain printing for decorative, informative and other purposes, and the objects of this invention will not be defeated if the printing is in the interface between the base and the film or if the printing media has adhesive characteristics.

The pressing step of the process is maintained for a time, such as several seconds or less, to insure a proper physical bond between the film and the base. It has been found that when the base and the film have been preheated in the manner explained above, and the film is pressed into contact with the base by vacuum in the range of about 20 inches of mercury an extremely strong, mechanically inter-locking bond between the plastic and the pulp can be attained in less than about 1 second. A film of polyethylene terephthalate with a thickness of approximately 1.0 mil can be both rapidly pre-heated and then quickly pressed onto contact with a pre-heated base in a total time of less than about 1 second.

If mechanical pressing or the use of super-atmospheric pressure is employed, then the time required to obtain a suitable bond will be shorter, as can be understood, which is an extremely important consideration for mass production techniques.

Thereafter, the base and liner are allowed to cool to room temperature. The presently preferred process for cooling the base and liner is to remove the lined base from the heated vacuum die 12, following which the product cools slowly to room temperature. After removal from the heated die 12, the molded pulp base portion of the product retains heat, which is dissipated slowly, requiring at least several minutes, depending on the mass of the article and whether the articles are immediately nested in a stack for cooling, to cool from the bonding temperature to room temperature.

Appropriate trimming of excess film and/or molded pulp, such as at the edges of the product or around apertures through the product, can be performed by any well-known method before, during or after either the bonding step or the cooling step.

Finally, it is now contemplated that a final heat annealing step may prove useful to further crystallize the liner, for improving its properties for certain end uses. This would involve exposing the finished product to a temperature in the range between about 250° F. and about 400° F. for several minutes or more.

Fourth, the polyester lined molded pulp product 20 of this invention consists essentially of a pre-formed contoured base 10 of fibrous pulp, which may or may not contain one or more sizing ingredients, with a liner 22 directly bonded to at least one contoured portion of at least one side of the base, as shown in FIG. 4. The liner 22 is substantially impervious, and consists essentially of polyethylene terephthalate which will not shrink-separate away from the contoured base 10 as a result of exposure to a temperature of about 400° F.

As explained first above in connection with the detailed description of the pre-formed base, the base of the product according to the preferred embodiment of this invention is obtained by molding fibrous pulp to substantially finished contoured shape, and then drying the pulp under pressure imposed by a mating pair of heated dies. The pulp is substantially 100% bleached kraft wood fibers, which will not exhibit significant undesirable browning as a result of exposure to a temperature of about 400° F. for as long as 15 minutes.

Also as explained above, the polyester terephthalate liner according to the preferred embodiment of this invention, if separated from the base, would be found to be not readily bondable to molded pulp at any temperature below about 400° F. The liner has a crystallinity of at least about 8%, which may account for the fact that the material is not readily bondable to molded pulp in the manner in which the starting film was. The strong bond obtained initially by the above-described process, however, is not adversely affected by the subsequent loss of bonding characteristics.

Purely representative products according to this invention are illustrated in FIGS. 1 and 2. FIG. 1 is a pictorial view of a relatively simply and shallowly contoured food serving container 30 having horizontal base wall portions 32, a horizontal marginal rim or flange wall portion 34, sloping side wall portions 36, and sloping partitioning rib wall portions 38, but no substantially vertical wall portions.

FIG. 2 is a pictorial view of a relatively intricately and deeply contoured muffin baking container 40 which is three-dimensionally contoured with horizontal base wall portions 42, horizontal upper connecting wall portions 44, and steeply sloping relatively deep wall portions forming a series of closely spaced pockets 46, but no substantially vertical wall portions.

In every case, the container or other product according to this invention is three-dimensionally contoured without substantially vertical wall portions to permit a plurality of like empty containers, such as the containers 50 illustrated in fragmentary fashion in FIG. 3, to be either deeply or shallowly nested, one within another, in a stack of such containers for compact, economical and convenient shipment and storage purposes. Insubstantial vertical wall portions 52 may be provided to form anti-jamming shoulders to facilitate de-nesting the empty containers from the stack, as is well known.

The product according to the preferred embodiment of this invention, such as an ovenable food container, can be exposed to a temperature of about 400° F. and the liner will neither melt nor shrink-separate away from the contoured base. Such a product may be held at a temperature of about 400° F. for as long as 15 minutes and the molded pulp base still will not exhibit significant undesirable browning (although the pulp base will brown and eventually char if held at such a high temperature for times longer than about 15 minutes).

In actual use, a product according to the preferred embodiment of this invention can withstand higher temperatures for longer times when food or other substances are heated in the container product. For instance, the muffin baking container of FIG. 2, with baking batter in the pockets, both at room temperature, can be exposed for the purpose of baking muffins in the container to temperatures as high as 450° F. for as long as 45 minutes without liner separation or pulp browning. This is because the cool batter being first warmed and then baked has a chilling heat sink effect which prevents the container itself from attaining a temperature as high as about 400° F. for more than about 15 minutes, although by the end of the 45 minute period the edges of the container, remote from the muffin pockets, may exhibit some yellowing.

Similarly, the food serving container illustrated in FIG. 1 containing a frozen meal may be subjected to temperatures as high as about 450° F. for as long as 45 minutes, for the purpose of warming the meal with or without substantial additional cooking, without liner separation or pulp browning. The temperatures and times will depend on the mass of the container, and particularly the mass and shape of the food or other substances heated in it, as well as the starting temperature of the container and its contents when first exposed to such high temperatures. In addition, the end use parameters will depend on the manner in which heat is applied to the container and its contents. A conventional home convection oven will apply heat in a manner which is different from a commercial contact oven, both of which heat the container as well as its contents, whereas a microwave oven directly heats only the contents and the container is heated only indirectly by the heating contents but not the microwaves.

In the latter regard, the ovenable food container product according to the preferred embodiment of this invention has many advantages over food containers made of aluminum, for instance. Unlike aluminum, the container of this invention is transparent to microwaves, so that the container may be used in either microwave or heat ovens. The product of this invention is significantly less energy intensive to manufacture than aluminum containers, and the containers of this invention are recyclable relatively inexpensively.

When a product according to this invention is heated in actual use, it is suspected that the polyethylene terephthalate liner increases in crystallinity, which decreases its tendency to shrink-separate away from the base, even as the pulp base may begin to lose some of its original characteristics during exposure to high temperatures for long times. If this understanding is correct, then the product of this invention is not static in its characteristics when exposed to heat during end use, but rather the heat changes the characteristics of both the pulp and the polyester but in a manner which still is compatible with the requirements for an ovenable food container.

While the above described embodiments constitute the best mode now known for practicing this invention, other embodiments and equivalents are within the scope of the actual invention, which is claimed as:

1. A process for directly bonding a substantially impervious polyester liner to a contoured molded pulp base which comprises the steps of (1) pre-heating a pre-formed base which has been obtained by molding fibrous pulp from an aqueous slurry thereof against an open-face suction mold to substantially finished contoured shape which includes horizontal and sloping but no substantially vertical wall portions, (2) pre-heating a film of polyester and (3) then pressing the pre-heated film into contact with at least one contoured portion of at least one surface of the pre-heated base so that the film is stretched into direct contact with the contoured base and becomes directly bonded to the base to form a contiguous and integral liner thereon, the improvement being that the polyester film is (a) substantially amorphous, substantially unoriented polyethylene terephthalate and it (b) is pre-heated to a thermoforming temperature within the range in which it will substantially crystallize in time but then (c) is rapidly pressed into contact with and bonded to the base while it is still substantially amorphous and before enough time has passed in that temperature range to crystallize it to the stage at which it will not directly bond to the base, whereby (d) after the lined product is cooled to room temperature the liner will not shrink-separate away from the contoured base as a result of subsequent exposure to a temperature of about 400° F.

2. A process as in claim 1 wherein the film has a thickness of less than about 2.0 mil, and it is pre-heated to a thermoforming temperature within the range of from about 250° F. to about 400° F. but then is rapidly pressed into contact with and bonded to the base before the film has been at that thermoforming temperature for longer than about 2 seconds.

3. A process as in claim 2 wherein the base has been obtained by molding fibrous substantially 100% bleached kraft wood pulp from an aqueous slurry thereof against an open-face suction mold, and then drying the same under pressure imposed by a mating pair of heated dies.

4. A process as in claim 1 wherein the starting film of polyethylene terephthalate is substantially amorphous having less than about 5% crystallinity, and the crystallinity of the liner bonded to the molded pulp base has been increased to at least about 8%.

5. A process as in claim 1 wherein the polyethylene terephthalate liner is no longer readily bondable to molded pulp at any temperature below about 400° F.

6. A process as in claim 1 wherein the polyethylene terephthalate has a molecular weight in excess of about 15,000.

7. A process as in claim 1 wherein the starting film of polyethylene terephthalate becomes thermoformable at and above a temperature of about 170° F., it crystallizes when held for more than a few seconds at a temperature in the range between about 250° F. and about 400° F., and it melts at temperatures in excess of about 480° F. to about 490° F.

8. A polyester-lined molded pulp product produced by the process of claim 1.

9. A polyester-lined molded pulp product produced by the process of claim 1.

10. A plastic-lined molded pulp product which is three-dimensionally contoured with horizontal and sloping but no substantially vertical wall portions to permit like products to be nested one within another in a stack of such products, the product comprising a pre-formed base obtained by molding fibrous pulp from an aqueous slurry thereof against an open-face suction mold to substantially finished contoured shape, and a substantially impervious liner directly bonded to at least one contoured portion of at least one surface of the molded pulp base, the liner consisting essentially of polyethylene terephthalate obtained from a substantially amorphous and substantially unoriented film thereof which will not shrink-separate away from the contoured base as a result of exposure to a temperature of about 400° F.

11. A product as in claim 10 wherein the pre-formed base is obtained by molding fibrous pulp to substantially finished contoured shape, and then drying the pulp under pressure imposed by a mating pair of heated dies.

12. A product as in claim 10 wherein the fibrous pulp of which the contoured base is molded will not exhibit significant undesirable browning as a result of exposure to a temperature of about 400° F. for as long as 15 minutes.

13. A product as in claim 10 wherein the pulp of which the contoured base is molded is substantially 100% bleached kraft wood fibers.

14. A product as in claim 10 wherein the fibrous pulp of which the contoured base is molded has been treated with a fluorocarbon oil repellant sizing and/or a reactive synthetic water repellant sizing.

15. A product as in claim 10 wherein the polyethylene terephthalate liner has a molecular weight in excess of about 15,000.

16. A product as in claim 10 wherein the polyethylene terephthalate liner is not readily bondable to molded pulp at any temperature below about 400° F.

17. A product as in claim 10 wherein the polyethylene terephthalate liner has a crystallinity of at least about 8%.

* * * * *

UNITED STATES PATENT AND TRADEMARK OFFICE
CERTIFICATE OF CORRECTION

PATENT NO. : 4,337,116
DATED : June 29, 1982
INVENTOR(S) : Peter D. Foster and Clifford Stowers It is certified that error appears in the above-identified patent and that said Letters Patent are hereby corrected as shown below:

Column 1, line 19, "of" should be -- or --

Column 3, line 16, "substrate" should be -- substance --

Column 5, line 16, "Offenlgungsschrift" should be

-- Offenlegungsschrift --

Column 12, line 4, "1" should be -- 3 --

Signed and Sealed this

Fifth Day of October 1982

[SEAL]

Attest:

GERALD J. MOSSINGHOFF

Attesting Officer

Commissioner of Patents and Trademarks